C. E. KIMBALL.
TIRE PROTECTOR.
APPLICATION FILED FEB. 12, 1907.
927,980.
Patented July 13, 1909.
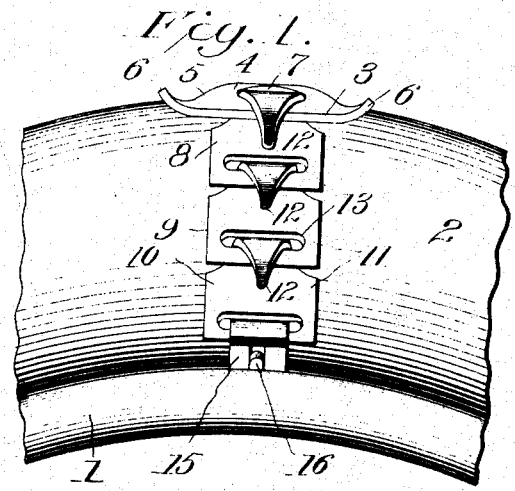
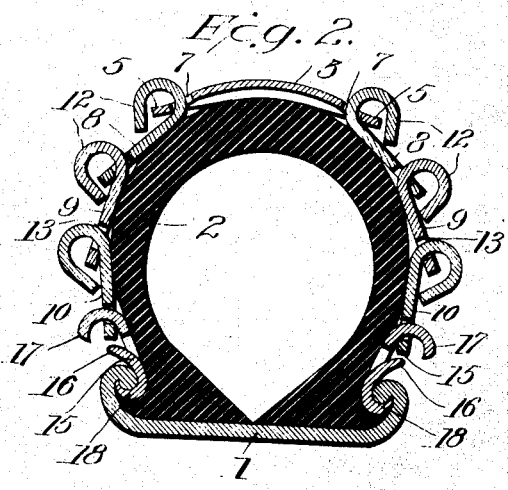
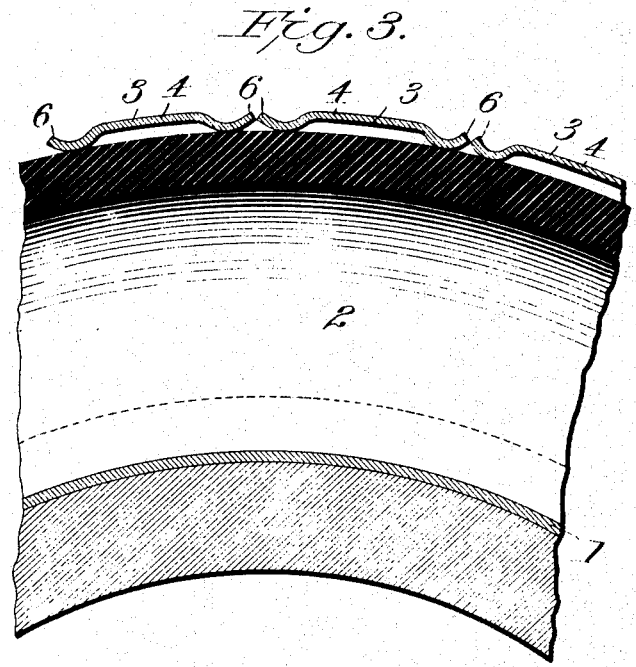
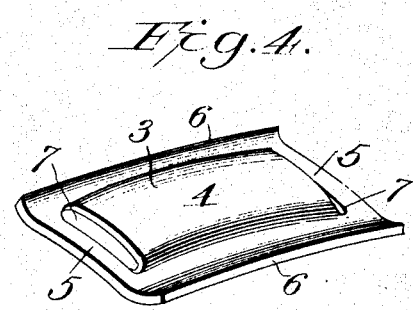
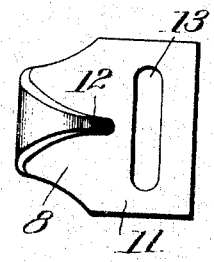
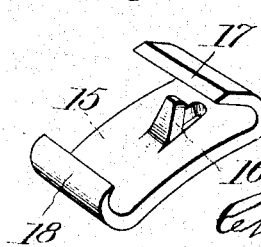
Inventor
Charles E. Kimball
Witnesses
By Chas. F. Kimball
Attorney

UNITED STATES PATENT OFFICE.

CHARLES E. KIMBALL, OF COUNCIL BLUFFS, IOWA.

TIRE-PROTECTOR.

No. 927,980.

Specification of Letters Patent.   Patented July 13, 1909.

Application filed February 12, 1907. Serial No. 356,980.

*To all whom it may concern:*

Be it known that I, CHARLES E. KIMBALL, a citizen of the United States, residing at Council Bluffs, in the county of Pottawattamie and State of Iowa, have invented certain new and useful Improvements in Tire-Protectors, of which the following is a specification—

This invention relates to tire protectors.
One object of the invention is to provide an armor for pneumatic or other tires embodying such characteristics that the tire is shielded from wear and prevented from slipping.
Another object resides in the provision of a tire protector made up in series of separate and independent sets of chains arranged transversely of the tire and secured against displacement by engagement with the rim of the wheel with which the tire is associated.

A still further object is to provide an armor for tires embodying simplicity, inexpensiveness, durability and efficiency.

With the above and other objects in view, the present invention consists in the combination and arrangement of parts hereinafter described, illustrated in the accompanying drawings, and particularly pointed out in the appended claims, it being understood that changes may be made in the form proportion, size and minor details without departing from the spirit or sacrificing any of the advantages of the invention.

In the drawings:—Figure 1 illustrates a portion of a wheel having my invention applied thereto. Fig. 2 is a transverse sectional view through the tire and my improved armor. Fig. 3 is a longitudinal section view through a portion of the tire, illustrating a few of the armor elements. Fig. 4 is a detail perspective view of the tread plate. Fig. 5 is a transverse sectional view of the tread plate. Fig. 6 is a plan view of one of the chain plates; and Fig. 7 is a detail perspective view of one means for securing the armor to the rim of the wheel.

Referring now more particularly to the accompanying drawings, the reference character 1 indicates a rim and 2 the tire of a wheel, it being understood that the tire may be a solid, inflatable or any other variety of tire, especially, however, one of the type particularly adapted for use in connection with automobiles.
As the separate sets of chains are similar in form, I will describe but one of them, and reference to the accompanying drawings will disclose that the character 3 indicates a tread plate concaved upon its under face to form a raised portion 4, each end of the tread plate being directed downwardly as indicated at 5, with its edges 6 turned upwardly for a purpose presently explained. Formed in the tread plate near each end thereof and preferably at the ends of the raised portion 4, is a slot 7, each slot lying in an inclined plane corresponding to the inclination of the downwardly directed ends of the tread plate.

The reference characters 8, 9 and 10 indicate a series of chain plates, each formed alike, and consisting of a body portion 11 reduced at one end to form a tapering tongue 12 adapted to be bent at substantially a right angle to the body 11 of each chain plate, the tongue 12 of the plate 8 engaging the slot 7 at each end of the tread plate and the tongues 12 of the chain plates engaging successively in the slots 13 formed in each of the chain plates, said tongues being preferably bent back into engagement with the body portion of the corresponding chain plate.

Connecting the slot 13 of the outermost chain plate is a connecting element or hook 15 provided with a lip 16 struck up therefrom and directed toward the bent end 17 of said element to prevent disengagement of the latter from the outermost chain plate. The opposite end of the connecting element 15 is bent, as at 18, for engagement with the rim 1 between the latter and the tire 2, as shown, the outermost faces of the bent ends 17 and 18 being preferably beveled.

In practice I prefer not to have the adjacent series of plates overlap, although I do prefer that the upwardly directed edge portions 6 of the tread plates 4 have intimate engagement as illustrated in Fig. 3 to prevent the admission and accumulation of foreign matter beneath the tread plates. By reason of the raised portion of the tread plates, they do not bear throughout their surfaces upon the tire, thereby preventing undue wear of the tire or plates incident to any possible frictional engagement between the tire and tread plates. All of the plates, including the hook or connecting element 15, are arranged to present a flat surface to the tire at their joints to provide for a rolling motion to reduce friction and wear. In other words, there is a right angle joint connection between the plates. To accomplish this right angled joint connecting and consequent rolling motion of the plates the tongues or bent portions of the connecting plates are passed through the slots of adjacent plates at right angles to their body portions so that on slight motion the parts will rock instead of slide upon one another.

When the armor elements have been positioned upon the wheel, that is, when the connecting elements or hooks 15 have been engaged with the rim of the wheel, the fingers 16 will positively prevent unhooking or detachment of the armor elements by reason of the fingers 16 coöperating with the bent ends 17 of the connecting elements or hooks 15. One feature of the invention resides in the fact that the body portions of the plates do not overlap, but that, on the other hand, the body portions of the chain plates are spaced slightly from one another, and while I have stated hereinbefore that the tongues 12 of the chain plates are preferably bent into engagement with the body portions of the plates, it is to be understood that this engagement of the extremities of the tongues with the body portions of the plates is not essential.

What is claimed is:—

1. A tire protector comprising a series of tread plates each having a raised intermediate portion, upturned side flanges and a slot near each end, a series of interlocking plates connected in each slot of each tread plate, and a connecting member secured to the outermost interlocking plate of each series, the upturned side edges of adjacent tread plates meeting one another.

2. A tire protector comprising a series of tread plates each having a raised intermediate portion, upturned side edges and a slot near each end, a series of interlocking plates connected in each slot of each tread plate, and a connecting member secured to the outermost interlocking plate of each series to connect the corresponding tread and interlocking plates upon the tire.

3. A tire protector including a series of tread plates each provided with a raised intermediate portion, upturned side edges and a slot near each end, and means having connection with each slot to secure the plates upon the tire.

4. A tire protector comprising a series of tread plates each having a raised intermediate portion, upturned side edges and a slot near each end, the ends of each plate being disposed upon an incline with respect to its body portion, a series of interlocking plates connected in each slot of each tread plate, and a connecting member secured to the outermost interlocking plate of each series to secure the corresponding tread and interlocking plates upon the tire, said connecting member having a rigid finger struck up therefrom, substantially as shown and described.

5. A tire protector comprising a series of tread plates each having its opposite sides disposed upon an incline with respect to its body portion and also having a slot near each end, and means having connection with each slot to secure the plates upon the tire.

In testimony whereof I affix my signature, in presence of two witnesses.

CHARLES E. KIMBALL.

Witnesses:
 CLEM. F. KIMBALL,
 ETHEL HEISLER.